United States Patent
Inoue et al.

(10) Patent No.: US 8,184,332 B2
(45) Date of Patent: May 22, 2012

(54) IMAGE FORMING APPARATUS AND METHOD FOR CORRECTING DENSITY IRREGULARITIES

(75) Inventors: Nozomu Inoue, Matsumoto (JP); Kiyoshi Tsujino, Matsumoto (JP); Ken Ikuma, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1477 days.

(21) Appl. No.: 11/682,771

(22) Filed: Mar. 6, 2007

(65) Prior Publication Data

US 2007/0206227 A1 Sep. 6, 2007

(30) Foreign Application Priority Data

Mar. 6, 2006 (JP) ................................. 2006-058906
Oct. 11, 2006 (JP) ................................. 2006-277629

(51) Int. Cl.
G06K 15/22 (2006.01)
(52) U.S. Cl. ...................................................... 358/1.4
(58) Field of Classification Search .................. 347/240, 347/237; 399/374
See application file for complete search history.

(56) References Cited

U.S. PATENT DOCUMENTS

| | | | | |
|---|---|---|---|---|
| 5,629,781 A * | 5/1997 | Ueno et al. | ..................... | 358/523 |
| 6,347,203 B1 * | 2/2002 | Kutsuwada | ..................... | 399/82 |
| 7,423,750 B2 * | 9/2008 | Hoshizaki et al. | ............ | 356/317 |
| 2002/0021453 A1 * | 2/2002 | Sakamoto et al. | ........... | 358/1.14 |
| 2002/0064723 A1 * | 5/2002 | Nanya et al. | ............. | 430/108.22 |
| 2002/0118269 A1 * | 8/2002 | Sato | .............................. | 347/237 |
| 2002/0171697 A1 * | 11/2002 | Gargir et al. | .................... | 347/14 |

FOREIGN PATENT DOCUMENTS

| | | |
|---|---|---|
| JP | 03-190765 | 8/1991 |
| JP | 05-270057 | 10/1993 |
| JP | 07312677 A | 11/1995 |
| JP | 08-142406 | 6/1996 |
| JP | 09156154 A | 6/1997 |
| JP | 2001301228 A | 10/2001 |
| JP | 2002-292922 | 10/2002 |
| JP | 2004-148661 | 5/2004 |
| JP | 2004-188855 | * 7/2004 |

* cited by examiner

*Primary Examiner* — Benny Q Tieu
*Assistant Examiner* — Jeremiah Bryar
(74) *Attorney, Agent, or Firm* — DLA Piper LLP (US)

(57) ABSTRACT

An image forming apparatus includes an image processing unit that has line heads that include a plurality of light sources disposed in a line shape in a main scanning direction, causes each light source to emit light onto image data to form pixels on an exposed surface, and performs image exposure, and creates two-dimensional image data to be printed on the basis of an image signal from the outside and an operation instruction. The image processing unit corrects the two-dimensional image data such that a density irregularity is corrected on the basis of light amount data and/or optical characteristic data for each of the pixels for the line heads, according to a correction value created on the basis of the light amount data and/or optical characteristic data for each of the pixels of the line heads.

15 Claims, 5 Drawing Sheets

IMAGE FORMING APPARATUS AND METHOD FOR CORRECTING DENSITY IRREGULARITIES

CROSS REFERENCE

The present application claims the priority based on Japanese Patent Application No. 2006-58906 filed on Mar. 6, 2006 and Japanese Patent Application No. 2006-277629 filed on Oct. 11, 2006, the disclosure of which are hereby incorporated by reference in its entirety.

BACKGROUND

1. Technical Field

The present invention relates to an image forming apparatus in which an excellent image is formed without a density irregularity by using a simple circuit and a method of forming an image.

2. Related Art

Generally, an electrophotographic toner image forming unit includes a photoreceptor that serves as an image carrier having a photosensitive layer formed on an outer circumferential surface, a charging unit that uniformly charges the outer circumferential surface of the photoreceptor, an exposure unit that selectively exposes the outer circumferential surface uniformly charged by the charging unit so as to form an electrostatic latent image, and a developing unit that applies a toner serving as a developer to the electrostatic latent image formed by the exposure unit so as to form a visible image (toner image).

In a tandem-type image forming apparatus that forms a color image, the plurality of (for example, four) toner image forming units are disposed with respect to an intermediate transfer belt. As another image forming apparatus, there is an intermediate transfer belt type image forming apparatus in which toner images formed on a photoreceptor by a single color toner image forming unit are sequentially transferred to the intermediate transfer belt, a plurality of colors of toner images (for example, toner images of yellow, cyan, magenta, and black) overlap on the intermediate transfer belt, and a color image is obtained on the intermediate transfer belt.

In the tandem-type image forming apparatus that has the above-described structure, it has been generally known that an LED or an organic EL element serving as a light emitting element is used in a line head. In a light writing line head where the LED or the like is used as a light source, light amounts of a plurality of light sources (light-emitting units) are not uniform. In this state, if a write operation is performed, a density difference (striation) according to the light amounts, that is, a density irregularity may occur in the image formed by the write operation.

In order to prevent the density irregularity from occurring, according to the related art, a circuit is provided in which a light amount of each of a plurality of light sources that are provided to correspond to respective pixels is corrected at the time of a write operation to make a density uniform. The light amount is corrected by changing a driving current or a lightening time of each light source. Specifically, in order to correct the light amount, a light amount of each light source is measured at the time of a shipment of a line head, a correction value of a lighting time or a driving current corresponding to each pixel is written in a memory incorporated in the line head, and when the correction value is used, that is, when an image write operation is performed, the correction value is read and the driving current or the lightening time of each light source is corrected.

However, the correction circuit that is generally used needs to be provided to correspond to each pixel independently from a lightening control of each pixel. In particular, when performing a grayscale control that varies a light intensity of each pixel according to a density of an image, the grayscale control and the light amount correction need to be performed independently from each other, which complicates a circuit. Further, in a recent line head, with an advance of a light amount correcting technology, a light amount of each pixel on a scanned surface can be corrected such that the light amount becomes approximately uniform, that is, the light amount can be corrected within an error range of about 1%. However, in an actual image, a longitudinal streak/stripe may occur in a direction where a scanned medium moves. This is due to a case where even when a light amount is uniform, a size or shape of an image forming spot is different due to an irregularity of an image forming characteristic according to the location of a gradient refractive index type (rod) lens array (product name 'Selfoc lens array (SLA)', manufactured by Nippon Sheet Glass Co., Ltd.) which is generally used when an image is formed on a scanned surface by a light beam of each pixel. As such, a light amount of each pixel is corrected together with an irregularity in an image forming characteristic for each pixel due to the SLA. The term "image forming characteristic" in this application means the characteristic of the image of the light source formed by said lens array and does not means the pictorial image (toner image) characteristic formed by image forming apparatus which is presented on this appreciation.

In particular, in recent years, the line head is often used in an electrophotographic color page printer. In a color image, as compared with a monochromatic image, it is required for photography or a graphic to be further improved in expression and reproducibility, and a precision light amount correction needs to be performed. Meanwhile, the light amount correction is digitally performed. However, since the correction value needs a large amount of information, that is, a large number of bits in order to perform a precise light amount correction, it is likely for a light amount correcting circuit to be large-scaled.

In order to solve the above-described problems, various technological methods have been suggested. For example, JP-A-05-270057 discloses a method in which a correction value of each pixel is determined on the basis of a density difference of an actual image, not a light amount of a pixel. Further, JP-A-2002-292922 discloses a method in which a correction value is changed according to a light amount (grayscale value) of a light emitting unit. Furthermore, JP-A-03-190765 discloses a method in which a grayscale value and a correction value of each pixel are independently controlled. Furthermore, JP-A-08-142406 discloses a method in which a light amount is corrected on the basis of a width at any section in an intensity distribution of an image forming spot of each pixel. Furthermore, JP-A-2004-148661 discloses a method in which a correction value determined by an area of a beam (spot) is modified to a correction value according to an angle of a screen for performing a grayscale expression. Furthermore, JP-A-2004-188855 discloses a method in which correction data of each pixel is determined on the basis of characteristic data calculated by a beam area, a beam diameter, an MTF, or the like of each pixel and light amount data indicating a light amount of each pixel.

JP-A-05-270057 discloses a method in which a correction value is determined on the basis of a printed result, that is, a density irregularity but a correction operation is performed by controlling a light amount of a light emitting unit in a line head. Since a density of an image where an evaluation of a density irregularity is performed or a degree to which a density irregularity occurs due to a grayscale screen is different, this method is only effective in a specific image. Further, a method in which with respect to an individual line head, printing is actually performed and a correction value is calculated needs a complicated process. Therefore, the method cannot resolve the above-described problems.

A degree to which a density irregularity occurs due to an irregularity in a light amount of a light emitting unit is different according to a density of an image to be expressed. When the density is extremely high, that is, the density enters an approximately saturation state, an influence due to an irregularity in a light amount of a light emitting unit is a little. Further, even in a portion where a density is low, that is, a highlight portion, an influence due to an irregularity in a light amount of a light emitting unit is a little. Meanwhile, a portion where a density is middle may be easily affected by an irregularity in a light amount of a light emitting unit, and a streak-shaped density irregularity may easily occur.

According to the method disclosed in JP-A-2002-292922, in order to solve the above-described problems, a correction value is varied according to a grayscale value of each light emitting unit (pixel). However, in most of image forming apparatuses, since a plurality of pixels are disposed as a dot-shaped or line-shaped screen and a density is expressed, a grayscale value of an individual pixel is not in proportion to a grayscale value of an actual image. For this reason, even when using the method disclosed in JP-A-2002-292922, its effect is limited to a specific case.

The correction circuit that is disclosed in JP-A-03-190765 needs to be provided to correspond to each pixel independently from a lightening control of each pixel. In particular, when performing a grayscale control for changing a light intensity of each pixel according to a density of an image, a grayscale control and a light amount correction need to be performed independently from each other. As a result, the control circuit becomes complicated.

As such, in any one of the above-described methods, a light amount of each pixel becomes a correction target. However, as such, a density irregularity, such as a longitudinal streak, which occurs due to the line head, is varies according to the density of the image, and is varied according to a grayscale screen to be used. In the recent printers, types of a grayscale screen are used in a differentiated manner according to types of the image to be printed. For example, since a natural image, such as a photograph, is needed to have a uniform grayscale more than the resolution of the image, the pitch of dots or fine parallel lines of the grayscale screen to be used (this is referred to as the number of lines and is represented as the number of dots or fine parallel lines per 1 inch=25.4 mm) is decreased. Meanwhile, the characters or the line drawings, and the graphic are not needed to express the slight grayscale variation but need the resolution. Therefore, the screen having a large number of lines is used.

The density irregularity due to the light amount irregularity of the line head or the image forming characteristic irregularity of the SLA may be easily viewed if the number of lines of the grayscale screen to be used is increased. Accordingly, there is a problem in that even if the correction value of each pixel is applied, the degree of the density irregularity is different according to the screen to be used. In terms of this, there is a problem in that even when using the method disclosed in JP-A-08-142406, the correction cannot be effectively performed on the difference between the density irregularities due to the difference between the grayscale screens.

In the method disclosed in JP-A-2004-148661, a degree to which each pixel is corrected is changed according to the angle of the grayscale screen. However, as described above, even when the grayscale screen having the same angle is used, since the longitudinal steak of the image is different according to the darkness of the grayscale to be expressed. Therefore, there is a problem in that even when the correction value is changed by the screen angle, the effect is limited. Further, even when the screen angle is the same, if the screen pitch is different, the influence due to the characteristic irregularity of each pixel is different. In terms of this, an effect of when the correction value is changed by the screen angle is low. In the method disclosed in JP-A-2004-188855, an image forming characteristic is added to the light amount of each pixel, and the correction data is determined. However, in this method, since all of the characteristics of the grayscale screen are not considered, the characteristics of the grayscale screen, or the occurrence of the longitudinal streak due to the density of the image to be expressed is changed, and thus the correction effect is limitative.

Further, even when the angle of the grayscale screen and the number of lines are the same, an influence on the optical characteristic of each pixel due to the density to be expressed is different, and the correction effect may not be achieved. For example, when the image forming characteristic of an arbitrary pixel is degraded more than the other pixels (the image forming characteristics are not sufficient and the spot becomes large), the density becomes smaller in the low density portion, and the density becomes larger in the high density portion. In this case, the density cannot be uniformly corrected from the low density portion to the high density portion with a single correction value. As such, an influence that is applied to the image quality due to the light amount irregularity of each pixel of the line head, in particular, the optical characteristic irregularity is different according to the pitch of the screen or the density of the image. As a result, even when the characteristic of each pixel is evaluated with high precision, it is difficult to achieve a sufficient correction process.

SUMMARY

An advantage of some aspects of the invention is that it provides an image forming apparatus that is capable of forming an excellent image without a density irregularity by using a simple circuit, and a method of forming an image.

According to a first aspect of the invention, an image forming apparatus includes an image processing unit that has line heads that include a plurality of light sources disposed in a line shape in a main scanning direction, causes each light source to emit light onto image data to form pixels on an exposed surface, and performs image exposure, and creates two-dimensional image data to be printed on the basis of an image signal from the outside and an operation instruction. The image processing unit corrects the two-dimensional image data such that a density irregularity is corrected on the basis of light amount data and/or optical characteristic data for each of the pixels for the line heads, according to a correction value created on the basis of the light amount data and/or optical characteristic data for each of the pixels of the line heads.

According to a second aspect of the invention, an image forming apparatus includes an image processing unit that has line heads that include a plurality of light sources disposed in a line shape in a main scanning direction, causes each light source to emit light onto image data to form pixels on an exposed surface, and performs image exposure, and creates two-dimensional image data to be printed on the basis of an image signal from the outside and an operation instruction, and a head control unit that is supplied with the pixel data corresponding to each pixel from the image processing unit and performs a turned-on control and a light amount control of each of the pixels of the line heads. The image processing unit corrects the two-dimensional image data so as to correct a density irregularity due to an optical characteristic irregularity for each of the pixels of the line heads, according to an optical correction value created on the basis of the optical characteristic data for each of the pixels of the line heads, and the head control unit performs a control operation such that a light amount of each pixel becomes substantially the same, according to light amount correction data created on the basis of the light amount data for each pixel.

Preferably, a correction process on the two-dimensional data is performed before a screen process on dots or fine parallel lines is performed.

Preferably, a correction process on the two-dimensional data is performed on a natural image or a graphic and is not performed on a fine line or a character.

Preferably, a correction process on the two-dimensional data changes a correction degree according to a density of the two-dimensional image data.

Preferably, the image forming apparatus changes a correction degree according to a type of a screen to be used, when a grayscale screen for expressing a grayscale of the two-dimensional image is divided into a plurality of grayscale screens according to the type of the two-dimensional image or setting of a user and used.

Preferably, the correction process is performed on the two-dimensional image after performing a process for changing an exposure location of the two-dimensional image in the line head on the basis of margin information of a main scanning direction instructed by a user or application software.

Preferably, the correction process is performed on the two-dimensional image after performing a process for changing an exposure location of the two-dimensional image in the line head on the basis of image location information of a main scanning direction stored in a printer main body.

Preferably, the optical characteristic is a numerical value that is calculated from a light amount distribution of a spot formed when a light beam corresponding to each pixel forms an image on an exposed surface.

Preferably, the optical characteristic is a wavelength of each pixel.

Preferably, the light amount data and the optical characteristic data are individually written for each pixel.

Preferably, the light amount data and the optical characteristic data are stored in a nonvolatile memory provided in the line head for each pixel.

Preferably, the image forming apparatus is a color image forming apparatus, and the correction process is performed on image data of each color after a color conversion according to colors of color materials that are included in the image forming apparatus.

Preferably, a correction process is performed on the two-dimensional image data on the basis of color registration information in the main scanning direction for each color stored in a control unit of a printer, with respect to information after being divided into color data according to the color materials included in the image forming apparatus, after performing the process for changing the exposure location of the image data of each color in the line head.

Preferably, the image forming apparatus is a color image forming apparatus that simultaneously form a plurality of colors of images by using a plurality of line heads.

Preferably, the image forming apparatus is a color image forming apparatus that has one line head, and sequentially forms a plurality of colors of images and forms the plurality of colors of images on an intermediate transfer medium to overlap one another.

According to a third aspect of the invention, a method of forming an image includes causing an image processing unit to create two-dimensional image data to be printed on the basis of an image signal from the outside and an operation instruction by using line heads that include a plurality of light sources disposed in a line shape in a main scanning direction, causes each light source to emit light onto image data to form pixels on an exposed surface, and performs image exposure, storing light amount data and/or optical characteristic data for each pixel in a storage unit of each of the line heads, creating a correction value on the basis of the light amount data and/or the optical characteristic data for each pixel, and causing the image processing unit to correct the two-dimensional image data by using the correction value so as to correct a density irregularity on the basis of the light amount data and/or optical characteristic data for each of the pixels of the line heads.

According to a fourth aspect of the invention, a method of forming an image includes causing an image processing unit to create two-dimensional image data to be printed on the basis of an image signal from the outside and an operation instruction by using line heads that include a plurality of light sources disposed in a line shape in a main scanning direction, causes each light source to emit light onto image data to form pixels on an exposed surface, and performs image exposure, causing the image processing unit to transmit pixel data corresponding to each pixel to a head control unit performing a turned-on control and a light amount control of each of the pixels of the line heads, creating an optical correction value on the basis of the optical characteristic data for each pixel in each line head, creating light amount correction data on the basis of light amount data for each pixel, causing the image processing unit to correct the two-dimensional image data on the basis of the optical correction value so as to correct a density irregularity due to an optical characteristic irregularity for each pixel of the line head, and causing the head control unit to perform a control operation on the basis of the light amount correction data such that the light amount of each pixel becomes substantially the same. As such, since the two-dimensional image data is corrected without providing a light amount correction circuit for each pixel, an operation speed is increased, and it is possible to fast correct a density irregularity due to a light amount irregularity for each pixel.

According to the image forming apparatus and the method of forming an image according to the aspects of the invention, the light amount correction can be performed on each pixel without providing the light amount correction circuit for each pixel, and thus an excellent image can be obtained without a density irregularity while a simple circuit is used. That is, since the control circuit for correction does not need to be provided in all of the line heads, it is effective in terms of the cost down, the reduction in a size, and improvement of the reliability in the line head. In particular, in a tandem-type color printer that uses four line heads, the effect becomes very larger.

Further, the correction process is performed before the screening process is performed, and thus a correction degree can be controlled according to types of the screens to be applied to the grayscale expression. Therefore, an excellent correction result can be obtained without depending on the types of the screen, such as an angle or a pitch (number of lines) of the screen. Further, the correction degree is changed according to the density of the original image. Therefore, in an middle density portion of the image that is much affected by the light amount irregularity in a light emitting unit (pixel), the excessive correction is not made in the low density portion that is slightly affected by the light amount irregularity or a high density portion while the correction process is performed such that the density irregularity does not occur.

Further, the correction process is performed after converting the location of the image data with respect to the line head according to respective information including left and right margin information instructed from a user or application software, left and right image position information stored in the printer main body, and color registration information in left and right directions for each color. For this reason, even when the position information is varied, a proper correction process on the density irregularity can be performed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
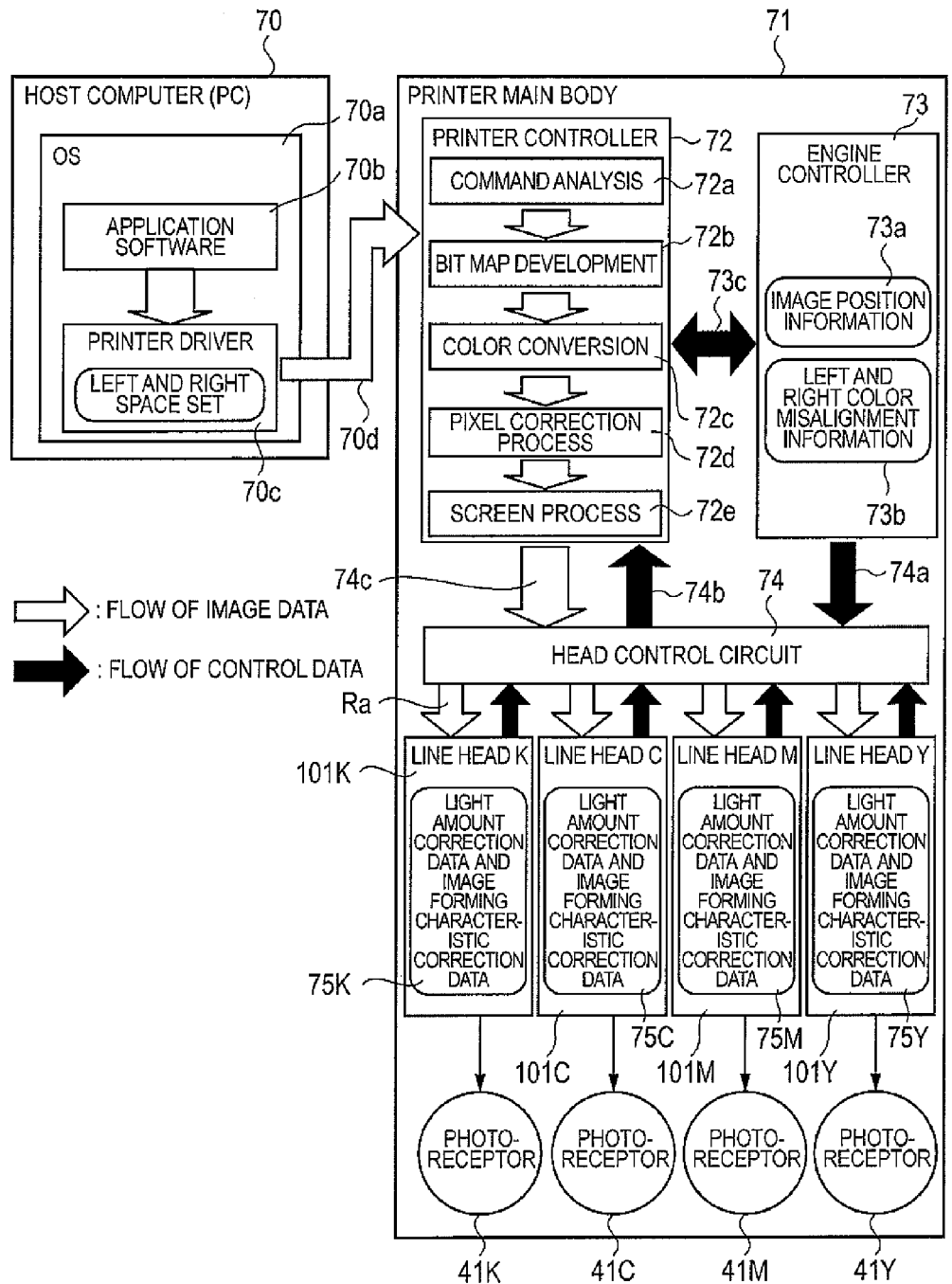
FIG. 1 is a block diagram illustrating an embodiment of the invention.

FIG. 1 is a block diagram illustrating a schematic structure of a control unit according to an embodiment of the invention. In FIG. 1, reference numeral 70 indicates a host computer that uses a personal computer (PC) or the like, and creates image data and transmits the created image data to a printer controller 72 that is provided in a control unit 71 of a printer. An operating system (OS) 70a of the host computer 70 allows application software 70b to operate a printer driver 70c and transmits data indicating a left and right margin set of an image or the like to the printer controller 72 through a signal line 70d.

The printer controller 72 performs an analysis process 72a that analyzes a command of the image data that is transmitted from the host computer 70, and performs a bit map interpreting process 72b. Then, the printer controller 72 performs a color conversion process 72c on the image data that has been subjected to bit map interpreting, performs a screening process 72e after a pixel correction process 72d, and performs a signal transmitting process 73c that transmits a signal to a line head control circuit 74. The detailed of the processes 72a to 72e that are performed by the printer controller 72 will be described below.

The printer controller 72 exchanges a signal together with an engine controller 73. In a memory of the engine controller 73, image location information 73a and left and right color registration information 73b are stored. A signal supplied by the engine controller 73 is also transmitted to the line head control circuit 74 (refers to reference numeral 74a). The line head control circuit 74 transmits a control signal to line heads 101K, 101C, 101M, and 101Y. In respective memories of the line heads 101K, 101C, 101M, and 101Y, light amount correction data and image forming characteristic correction data 75K, 75C, 75M, and 75Y are stored. Photoreceptors 41K, 41C, 41M, and 41Y of the respective colors are exposed on the basis of the light amount correction data and the image forming characteristic correction data. Image data Ra and control data Rb are exchanged between a line head control circuit 74 and the respective line heads 101K, 101C, 101M, and 101Y.

Next, a control operation on the respective units shown in FIG. 1 will be described. First, the description is given of a printing process in the host computer 70 where the general-purpose OS is mounted. A printing command from a program of the application software 70b is converted into a page description language (PDL) corresponding to each printer by software that is referred to as a printer driver 70c corresponding to each printers and is output to a port (printer controller 72) to which each printer is connected. The port to which the printer is connected is a parallel interface according to the related art, a USB, or a wide area network interface.

In the data that is converted into the PDL, in addition to two-dimensional image data, such as a natural image, charter information, line drawing information, or graphic information (a location and a size of an image) are contained. A printer main body 71 is connected to the host computer 70 where the data is formed, through an appropriate interface. In the printer main body 71, an image processing unit is provided which includes a printer controller 72, an engine controller 73, and a head control circuit 74.

Next, a process that is performed in the printer will be described. The printer that has received the data of the PDL performs an analysis process 72a that analyzes languages (commands) having received through the printer controller 72, and performs a interpreting process 72b that interprets the languages into two-dimensional image data (bit map data). Among the languages (commands) that are received by the printer controller, a language that is associated with the printing of a character is interpreted into bit map data of the character on the basis of designated font data. Similarly, a plotting command of a diagram, such as a straight line, a circle, or a rectangle, is also interpreted into bit map data according to its attribute. Further, the data that is directly transmitted as the two-dimensional image data is written in bit map data as it is.

In most of cases, the image data is RGB data of three primary colors. However, in the printer, since colors, that is, CMYK (cyan, magenta, yellow, and black) overlap one another and represent a color image, it is required to perform a color conversion process 72c for converting the RGB data into the CMYK data. That is, it is required to perform a color conversion process according to colors of color materials included in the image forming apparatus (printer). Further, the data may be directly output as the CMYK data according to types of applications. In this case, the color conversion process does not need to be performed. Then, a pixel correcting process 72d is performed. The pixel correcting process performs a control operation such that a light amount of each pixel becomes substantially the same, according to light amount correction data created on the basis of light amount data for each pixel.

Even when the CMYK data having subjected to a color conversion process in the above-described manner is printed by the printer as it is, it is difficult to perform a grayscale level control. In particular, since an S-shapedy $\gamma$ curve (image density characteristic with respect to an input grayscale value) exists in an electrophotographic type, an area grayscale conversion needs to be performed. This process is referred to as a screen process 72e. At this time, a screening process according to resolution or the number of grayscale levels (number of bits) in the line head is also performed.

The screen process 72e compares the original image and the dot arrangement data of the screen, and converts it into the dot arrangement of the dot shape or a fine parallel line shape. For example, even when the original image has resolution of 600 dpi (dot/inch=25.4 mm), the density is represented by a size of dots of 100 to 200 lines or a size of an inclined fine parallel line. Accordingly, the resolution of the original image is lost to some degree. However, as compared with a case where a density (actually, exposure amount) of each pixel having the resolution of 600 dpi is varied, the grayscale becomes stable and it becomes difficult to be affected by various disturbances or an error factor. The image data on which the screening process has been performed is transmitted to the line heads 101K, 101C, 101M, and 101Y corresponding to the respective colors through the line head control circuit 74.

Next, a technology for using the grayscale screen in a differentiated method will be described. As described above, the number of lines of the grayscale screen depends on the types of the image to be printed. Generally, it is required that in the natural image, such as a photograph, the grayscale is smooth and, in a portion where an original image is uniform, the printed material also has a uniform density. Further, an accurate color tone is required. In this case, even though the resolution is slightly sacrificed, the number of the grayscale levels is increased by using the screen having the small number of lines, and thus the grayscale stability is improved. Accordingly, it becomes difficult for the screen to be affected by the characteristic variation of types of the electrophotographic process. As a result, it is difficult for the screen to be affected by the irregularity in the light amount of the line head or the irregularity of the image forming characteristic.

Meanwhile, in a text (character) or a line drawing, since the resolution is more required than the grayscale, the screen having the large number of lines is used. In this case, as compared with the case where the grayscale screen is used in a differentiated method, since the smoothness or the stability of the grayscale is deteriorated, it is easily affected by the irregularities of the electrophotographic process including the irregularities of the line head, and it becomes easier for the various density irregularities to be viewed. Accordingly, it is preferable to use a correction method that is different from a correction method on the screen used in the above-described natural image. However, since the resolution is improved by using the screen having the large number of lines, the color character having a fine middle tone or a fine line is reproducible. Further, the screens of the respective colors of the CMYK are not the same, but are different from one another in the number of lines, an angle, or a type.

As a preliminary step for embodying the correction method according to the embodiment of the invention, the light amount irregularity of the line head and the image forming characteristic distribution are measured. The line head that is used in this invention measures the light amount of each pixel at the time of shipment. Then, light amount correction data is created such that a density of each pixel is made uniform on the basis of light amount data of each pixel. In the processing method of the printer controller, a light amount value may be used as light amount correction data. As described below, when a light amount of each pixel is directly corrected by a circuit, current correction data of each pixel or pulse width correction data is created such that a light amount becomes uniform. Further, even when an error of a wavelength of each pixel is large and spectral sensitivity of the exposed photoreceptor at the corresponding wavelength is different according to the wavelength, an influence of a wavelength may be added to light amount correction data.

Then, an image forming characteristic (optical characteristic) of each pixel is also measured. The image forming characteristic is a characteristic of when a light beam of each pixel passes through a lens array and forms an image on a scanned surface, and with respect to a light amount profile of a section in a main scanning direction of a two-dimensional light amount distribution of the image or a subscanning direction, a width of when viewed at a threshold value, that is, a general spot size is representative. In addition, an area may be equal to or greater than a threshold value, and another process may be performed. In regards to the image forming characteristic (optical characteristic) of each pixel, a characteristic value not may be directly held and the image forming characteristic may be converted into image forming characteristic correction data in which the process may be easily performed. Hereinafter, light amount correction data of each pixel and image forming characteristic correction data are individually held in a storage unit.

The light amount correction data and the image forming characteristic correction data of each pixel that are measured in the above-described manner are written in a nonvolatile memory that is provided for each line head at the time of a shipment. When the data is written in another medium and the head is assembled in the printer without writing the data in the memory provided for each line head, the light amount correction data and the image forming characteristic correction data of each pixel may be stored in the printer main body. The data that is written in the nonvolatile memory provided for the line head indicates the image forming characteristics as a plurality of parameters according to the types of the grayscale screen to be used. As a result, a plurality of data may be held for one pixel and an optimal correction value may be calculated from a plurality of image forming characteristic correction data according to the types of the screen. Further, when the influence on the density irregularity of the image due to the image forming characteristics is small, the light amount correction data may be only created without creating the image forming characteristic correction data. At this time, the pixel characteristic measuring time at the time of a shipment of the line head can be drastically reduced.

Next, the correction operation on the density irregularity of the image will be described. As described above, the density of each of images that are divided in the respective colors is corrected on the basis of the light amount correction data or the image forming characteristic correction data for each pixel that is obtained at the time of a shipment. At this time, a correction coefficient is different according to the predetermined grayscale screen to be used. When the screen used for each color is different, a correction process on each color is different according to each screen.

A correction method of the light amount irregularity of each pixel is different from a correction method of the image forming characteristic (optical characteristic) irregularity of each pixel. First, a correction method of the light amount irregularity of each pixel will be described. If the light amount of the pixel is small regardless of the type of the grayscale screen to be used, the image density of the corresponding portion is necessarily decreased. In contrast, if the light amount of the pixel is large, the image density of the corresponding portion is necessarily increased. Therefore, in order to correct these characteristics, the image data is corrected. The influence due to the light amount irregularity of the pixel is also different according to the pitch of the grayscale screen or the density of the image to be represented. Accordingly, when the two-dimensional image data is corrected, the correction needs to be performed in consideration of this influence. This process is performed by the printer controller 72.

Whether each pixel forming the two-dimensional image data corresponds to which pixel of the line head is calculated by a method to be described below, and the correction amount of the density of each pixel forming the image is calculated according to the density of the pixel to be exposed and the type of the screen to be used. In the two-dimensional image, the image data that is drawn by each pixel of the line head is arranged in a linear shape in the moving direction (longitudinal direction) of the exposed medium that is orthogonal to the pixel arrangement direction of the line head in the image forming apparatus, and thus the image is corrected in a line unit in the longitudinal direction.

Meanwhile, in another embodiment of the invention, not only the correction of the light amount irregularity of the pixel can be performed by correcting the two-dimensional image data by the printer controller 72, but also the correction can be performed by the head control circuit 74. In this case, a current value of each pixel or a light emitting pulse width may be controlled such that a light emitting energy of each pixel becomes uniform, and the characteristic of the grayscale screen does not need to be considered.

Next, a correction method of the image forming characteristic (optical characteristic) irregularity will be described. As described above, the image forming characteristic of each pixel is evaluated by parameters such as a spot size or an area, a peak value, a wavelength from the profile of the light amount distribution of the image forming spot, and is held as an image forming characteristic correction value. Even in the case of the image forming characteristic, similar to the case of the light amount, the influence of the image forming characteristic is calculated according to the density of the two-dimensional image by each pixel or the type of the screen to be used, and the image data is corrected. However, since the influences on the image due to the light amount irregularity and the image forming characteristic irregularity, are different from each other, a calculation method for correcting the image data is also different from a calculation method in the case of the light amount.

Hereinafter, the correction method of the image forming characteristic irregularity will be described in more detail. It is assumed that the image forming characteristic of the pixel targeted in the line head is not better than those of the other pixels. For example, in the case where the light amount distribution profile expands and the spot size is large, when the density of the image to be exposed by the pixel is low, the number of peripheral turned-on pixels is small, or the interval between the corresponding pixel and the peripheral turned-on pixels becomes smaller. That is, the interference with the peripheral turned-on pixel is small. In this case, the latent image becomes faint as the spot becomes expanded, the potential of the peak is decreased, and an attached amount of the toner is decreased. Therefore, since the density is decreased, the correction is made such that in the portion of the corresponding pixels of the image to be printed, the density is increased.

In contrast, when the density of the pixel to be exposed is high, the number of the peripheral pixels is large and the distance between the corresponding pixel and the peripheral turned-on pixel is short. Therefore, the interference with the peripheral turned-on pixel is increased. In this case, since the light amount distribution of the target pixel expands, a portion not to be originally exposed in the space with the target pixel and the peripheral pixels is slightly exposed, and at the periphery of the corresponding pixel, the density is increased. For this reason, the correction operation for reducing the density is performed on the portion to be exposed in the corresponding pixels of the image.

As described above, with respect to the light amount irregularity of each pixel of the line head and the image forming characteristic (optical characteristic) irregularity, the correction data is individually held, and the corresponding information and the image density, and the process according to the screen type are corrected on each data by the different correction method, which achieves the precise density irregularity correction. It is difficult to logically determine a calculation method of when the two-dimensional image data is corrected on the basis of the light amount irregularity of each pixel or the image forming characteristic (optical characteristic) irregularity to be described above. Therefore, a calculation method is required which becomes a coefficient in which it is most difficult for the density irregularity to be viewed, through the experiments. At this time, as described above, it is affected by the types of the grayscale screen to be used or the line number (pitch), the image density, the photoreceptor or the interpreting device to be used, a toner, or the like. Accordingly, it is desired to calculate the characteristic by referring to the characteristics of the photoreceptor or the interpreting device and the toner that are used actually at the time of the printing process.

This correction process does not need to be performed on the minute line or the solid character. In the case of the graphic with the uniform density, for example, in the case where the paint-out is performed with a predetermined density in a rectangular shape or a circular shape, the correction process is performed. As such, the correction process of the image density according to the embodiment of the invention is performed after a color conversion in the printer controller 72.

Further, when the expanding process or the contracting process is performed for expanding or contracting the image to be printed according to the size of the paper, the correction process according to the embodiment of the invention needs to be performed after the expanding or contracting process is performed. Similarly, even in the case where the plurality of pages are printed on one page or the one page is divided into the plurality of pages and is then printed, the process is performed. After the image to be printed on one page is interpreted by the printer controller 72, the density irregularity correction process according to the embodiment of the invention is performed.

Next, the correction of the image position will be described. In this invention, the density irregularity to be generated is estimated in advance from the light amount irregularity of the line head or the data of the image forming characteristic, and the correction process is performed in a stage of an original image to be printed. Accordingly, if the actual location in the main scanning direction of the pixel of the line head deviates from the location in the main scanning direction of the original image, the proper correction may not be performed. The reason by which the correspondence relationship between the original image and the pixel location of the line head varies is as follows. In each case, the correction method will be described.

Case where the Image Location Varies by the Printer Driver 70c or the Application Software 70b The user may change the location of the image in the left and right directions on the printer driver to perform a margin adjustment (70c of FIG. 1) or the application software may control the image location. However, since this information is transmitted through the interface as the PDL, the location of the pixel of the line head can be associated with the location of the original image.

Image Location Adjustment of Printer Main Body

The location of the paper of the printer in a main scanning direction is varied for each printer due to the friction of the carrying path of the recording medium, such as the paper, and the characteristic of the paper. This location is adjusted by the printer main body. The paper feeding location is mechanically adjusted, but the shift of the writing location of the image is simple in terms of the design of the paper feeding mechanism. When the writing location is shifted, the image location information (73a of FIG. 1) that is stored in the engine controller is transmitted to the printer controller, and the writing location is corrected according to the image location information.

If the correction process according to the embodiment of the invention is performed on the data after the location correction is performed, the correspondence relationship with the actual location of the pixel of the line head and the location of the original image is taken. Further, the image location information is transmitted to the head control circuit, and the correction process can be technically performed without using the printer controller 72. However, since the correction process according to the embodiment of the invention may not be performed, this method cannot be used in this invention.

Location of Line Head of Each Color, that is, Color Registration Adjustment

In the tandem-type color printer, since the image forming of four colors including CMYK is simultaneously performed, four line heads are provided. In each line head, it is difficult to align the location of the pixel in the main scanning direction with the mechanical precision. For this reason, the writing location of the line head is changed for each color by using any method on the basis of the left and right color registration information (73b of FIG. 1) in the main scanning direction, and thus a process for aligning the exposure location of each color in the main scanning direction is performed.

As such, with respect to the information after being divided into color data according to the color materials that are included in the image forming apparatus, on the color registration information 73b in the left and right directions for each color stored in the control unit (engine controller 73) of the printer, a color registration correction process on the two-dimensional image data is performed.

The engine controller 73 stores the left and right color registration data 73b, but similar to Image location adjustment of printer main body described above, the correction process can be performed by the line head control circuit 74 without using the printer controller 72. However, similar to Image location adjustment of printer main body described above, since the correction process according to the embodiment of the invention cannot be performed, the position alignment in the main scanning direction needs to be performed by the engine controller 73.

The above-described embodiment has been described by using the tandem-type color printer in which the four color images are simultaneously formed. However, the invention can be applied to a four-cycle-type color printer in which the four colors are sequentially transferred to an intermediate transfer medium by using one photoreceptor and one line head. The four-cycle-type color printer will be described below with reference to FIG. 4. In this case, since the one line head is used, a process is performed for calculating correction values on the data for the light amount and the image forming characteristic of one line head according to the screen of each color. Therefore, the process for aligning the positions of the four heads in the main scanning direction, which is described in Location of line head of each color, that is, color registration to be described above, does not need to be performed.

As described above, the 'two-dimensional image' that becomes a target of a density irregularity correcting process according to the embodiment of the invention is performed on the image that is printed on the final recording medium (paper). That is, the diagram or the like is interpreted in the bit map, and is divided into the image of the color of the color material (toner) of the image forming apparatus. Further, in a state where the correction of the image forming location with respect to the recording medium, the correction of the size of the image, the position deviation correction between the colors or the like are performed, a correspondence relationship between each pixel of the image and the pixel of the line head needs to be determined.

In the above description, the internal circuit of the printer includes the printer controller 72, the engine controller 73, and the line head control circuit 74. The three circuits may be appropriately integrated with one another, or may be divided according to each function. Each function in the internal circuit may be implemented by hardware, software, or the combination thereof. As such, the internal circuit of the printer may be appropriately deformed.

In the above description, a series of image processes are performed by the printer controller 72 provided as the hardware in the printer. In recent years, the processing capability of the host computer 70, that is, the personal computer has been improved. Further, a transmission speed of the interface that transmits the data to the printer controller 72 from the host computer 70 has increased with the adoption of USB 2.0.

Accordingly, even when the above-described image process is performed by the software of the host computer 70, the sufficient process speed can be achieved. Even in this case, the invention can be applied, but it is required that the data for the unique light amount and the unique image forming characteristic of the line head is transmitted to the host computer 70 and the above-described correction process needs to be performed. Further, it is required that the positional information in Image location adjustment of printer main body and Location of line head of each color, that is, color registration adjustment to be described above, which is stored in the printer main body, need to be transmitted to the host computer, if necessary.

In the above-described embodiment, the printer has been exemplified as a peripheral apparatus that is connected to the host computer. The application of the invention is not limited to the printer, but the invention may be applied to various image forming apparatuses. For example, if an image scanner, an input console, and a control unit are provided in the image forming apparatus according to the embodiment of the invention, it may function as a digital copy machine. In this case, the density irregularity correction process according to the embodiment of the invention is performed on the image data of the original document read from the image scanner in the image forming apparatus.

Further, in the embodiment of the invention, an organic EL element is used as a light source. When the organic EL element is used, a plurality of pixels are formed on the glass substrate with high density and high precision. Further, in this invention, a grayscale control circuit or a light amount correction circuit does not need to be provided for each pixel. Therefore, the circuit structure becomes simplified, and a driving circuit can be easily formed with a thin film transistor on the same glass substrate as the pixel. The thin film transistor can be made of amorphous silicon, low temperature polysilicon, high temperature polysilicon, an organic transistor, and the like.

In the above example, the organic EL element has been described as the light source (pixel) according to the embodiment of the invention. In the embodiment of the invention, in addition to the organic EL element, an LED, a fluorescent tube, various shutter arrays, and the like may be used as the light source (pixel). The correction value according to the embodiment of the invention can be determined such that the correction is made, including the light amount correction and the density irregularity of the image due to the irregularity of the image forming performance of the load lens array. In this case, the image quality can be further improved.

Figure 2:
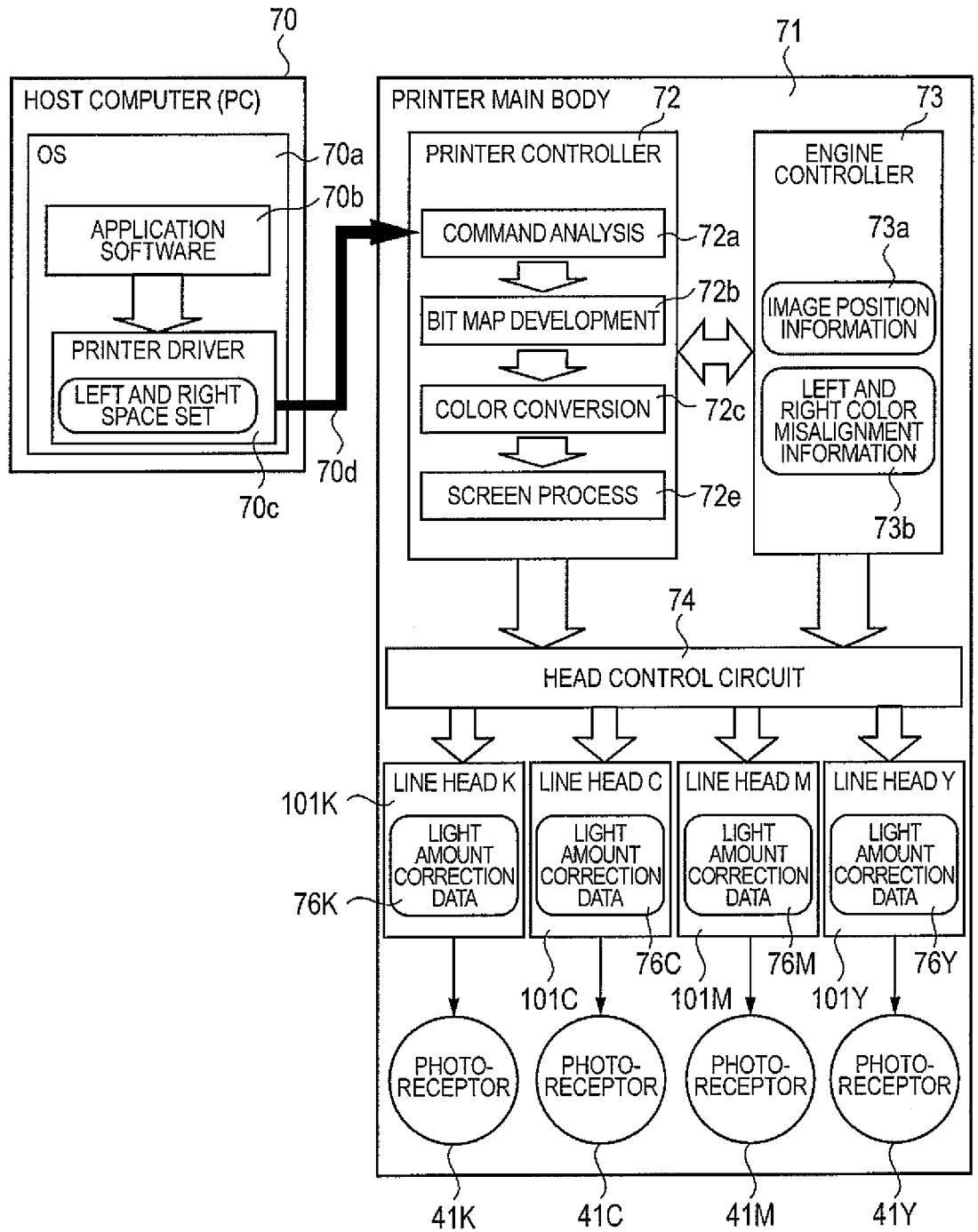
FIG. 2 is a block diagram illustrating an embodiment of the invention.

FIG. 2 is a block diagram illustrating a schematic structure of a control unit according to another embodiment of the invention. In FIG. 2, reference numeral 70 indicates a host computer that is used in a personal computer (PC) or the like, and has the same structure as that of FIG. 1. The printer controller 72 performs an analysis process 72a that analyzes a command of the image data that is transmitted from the host computer 70, and performs a bit map interpreting process 72b. Then, the printer controller 72 performs a color conversion process 72c on the image data that has been subjected to bit map interpreting, performs a screen process 72d, and performs a signal transmitting process that transmits a signal to a line head control circuit 74. The detailed of the processes 72a to 72d that are performed by the printer controller 72 will be described below.

The printer controller 72 exchanges a signal together with an engine controller 73. In a memory of the engine controller 73, image location information 73a and left and right color registration information 73b are stored. A signal supplied by the engine controller 73 is also transmitted to the line head control circuit 74. The line head control circuit 74 transmits a control signal to the line heads 101K, 101C, 101M, and 101Y. In respective memories of the line heads 10K, 101C, 101M, and 101Y, light amount correction data 75K, 75C, 75M, and 75Y are stored. The photoreceptors 41K, 41C, 41M, and 41Y of the respective colors are exposed on the basis of the light amount correction data.

Next, a control operation on the respective units shown in FIG. 2 will be described. First, the printing process in the host computer 70 where the general-purpose OS is mounted is the same as the description having been made with reference to FIG. 1. Next, a process at the printer side will be described. The printer that has received the data of the PDL performs an analysis process 72a that analyzes languages (commands) received through the printer controller 72, and performs a interpreting process 72b that interprets the languages into two-dimensional image data (bit map data). At this time, in most of cases, the image data is RGB data of three primary colors. However, in the printer, since CMYK (cyan, magenta, yellow, and black) overlap one another and represent a color image, it is required to perform a color conversion process 72c for converting the RGB data into the CMYK data. That is, it is required to perform a color conversion process according to colors of color materials included in the image forming apparatus (printer). Further, the data may be directly output as the CMYK data according to types of applications. In this case, the color conversion process does not need to be performed.

Even when the CMYK data having subjected to a color conversion process in the above-described manner is printed by the printer as it is, it is difficult to perform a grayscale level control. As described with reference to FIG. 1, a screening process 72e is performed.

When the correction method according to the embodiment of the invention is embodied, the light amount irregularity of the line head and the image forming characteristic distribution are measured. The line head that is used in this invention measures the light amount of each pixel at the time of shipment. Further, the image forming characteristic of each pixel is also measured, if necessary. The image forming characteristic is a characteristic of when a light beam of each pixel passes through a lens array and forms an image on a scanned surface, and with respect to a light amount profile of a section in a main scanning direction of a two-dimensional light amount distribution of the image or a subscanning direction, a width of when viewed at a threshold value, that is, a general spot size is representative. In addition, an area may be equal to or greater than a threshold value, and another process may be performed.

The light amount and the image forming characteristic of each pixel that are measured in the above-described manner are written in a nonvolatile memory that is provided for each line head at the time of a shipment when the data is written in another medium and the head is assembled in the printer without writing the data in the memory provided for each line head, the light amount correction data and the image forming characteristic correction data of each pixel may be stored in the printer main body.

The data that is written in the nonvolatile memory provided for each line head may be a light amount value and the image forming characteristic value, but may be converted into values suitable for correcting the density irregularity of the image. Further, the data that is written in the nonvolatile memory provided for the line head represents the image forming characteristics as a plurality of parameters according to the types of the grayscale screen to be used. As a result, a plurality of data may be held for one pixel and an optimal correction value may be calculated from a plurality of data according to the type of the screen. Further, when the influence on the density irregularity of the image due to the image forming characteristic is small, the light amount measuring value may be only created. At this time, the pixel characteristic measuring time at the time of a shipment of the line head can be drastically reduced.

Next, the correction operation on the density irregularity of the image will be described. As described above, the density of each of images that are divided in the respective colors is corrected on the basis of the light amount irregularity correction data or the image forming characteristic correction data for each pixel that is obtained at the time of a shipment. At this time, a correction coefficient is different according to the predetermined grayscale screen to be used. When the screen used for each color is different, a correction process on each color is different according to each screen.

When the light amount of each pixel is small, or the image density is decreased from the image forming characteristic, a correction is performed for increasing the density of the image of the corresponding portion. In contrast, when the light amount of each pixel is large, or the image density is increased from the image forming characteristic, a correction is performed for decreasing the density of the image of the corresponding portion. Further, since the influence due to the light amount irregularity or the image forming characteristic is different according to the density of the image, if the correction coefficient is changed according to the density of the original image, it is possible to obtain the further uniform image. This process is performed on all of the pixels in the subscanning direction that correspond to the pixel in the main scanning direction. As such, in the embodiment of the invention, the correction operation varies the correction degree according to the density of the two-dimensional image data.

This correction process does not need to be performed on a minute line or solid character. In the case of the graphic with the uniform density, for example, in the case where the paint-out is performed with a predetermined density in a rectangular shape or a circular shape, the correction process is performed. As such, the correction process of the image density according to the embodiment of the invention is performed after a color conversion in the printer controller.

In regards to the correction of the image location, (1) when the image location is changed by the printer driver 70c or the application software 70b, (2) when the image position is adjusted in the printer main body, and (3) when the location of the line head of each color, that is, a color registration is adjusted, the same correction as shown in FIG. 1 is performed.

Figure 3:
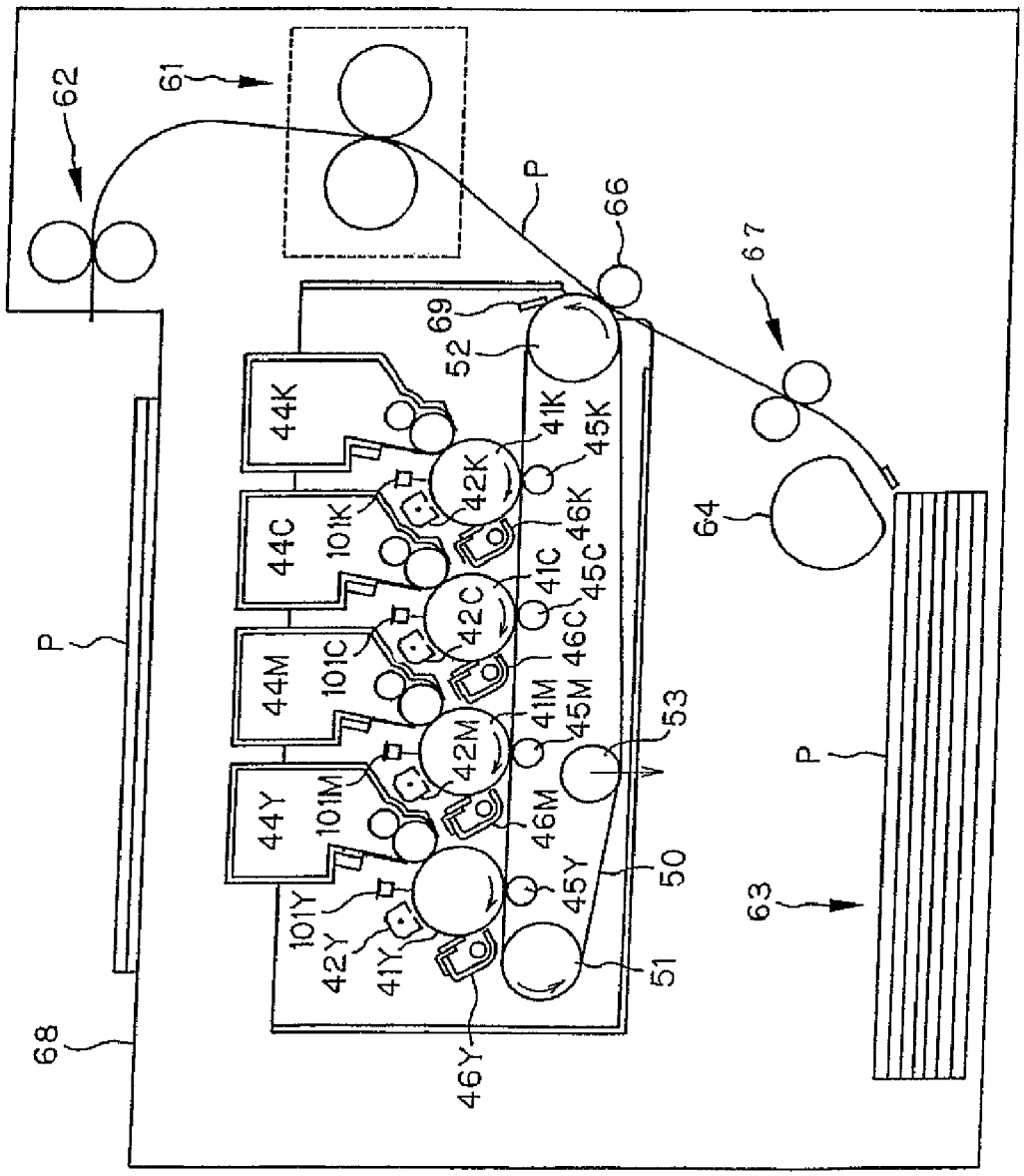
FIG. 3 is a longitudinal sectional view of an image forming apparatus according to an embodiment of the invention.

FIG. 3 is a longitudinal sectional view illustrating an example of a tandem-type image forming apparatus that uses an organic EL element as a light emitting element. In the image forming apparatus, four organic EL element array exposure heads (line heads) 101K, 101C, 101M, and 101Y each having the same structure are respectively disposed at exposure locations of the four photosensitive drums (image carriers) 41K, 41C, 41M, and 41Y each having the same structure that correspond to the four organic EL element array exposure heads 101K, 101C, 101M, and 101Y. The image forming apparatus is constructed as the tandem-type image forming apparatus.

As shown in FIG. 3, the image forming apparatus includes a driving roller 51x, a driven roller 52, a tension roller 53, and an intermediate transfer belt (intermediate transfer medium) 50 that is stretched according to extension applied by the extension roller 53, and is circularly driven in an arrow direction (counterclockwise direction) in the drawing. In the image forming apparatus, four photoreceptors 41K, 41C, 41M, and 41Y, which serve as four image carriers disposed at predetermined gaps with respect to the intermediate transfer belt 50 and have photosensitive layers formed on outer circumferential surfaces, are disposed.

The reference characters K, C, M, and Y, which are added to the ends of the reference numerals of the photoreceptors 41K, 41C, 41M, and 41Y, indicate black, cyan, magenta, and yellow, and indicate the photoreceptors for black, cyan, magenta, and yellow. This is applicable to other components, which will be described below. The photoreceptors 41K, 41C, 41M, and 41Y are rotatably driven in an arrow direction (clockwise direction) in the drawing when the intermediate transfer belt 50 is driven. Around the respective photoreceptors 41 (K, C, M, and Y), charging units (Corona chargers) 42 (K, C, M, and Y) that uniformly charge the outer circumferential surfaces of the photoreceptors 41 (K, C, M, and Y), and the line heads 101 (K, C, M, and Y) that perform sequential line scanning on the outer circumferential surfaces having being uniformly charged by the charging units 42 (K, C, M, and Y) in synchronization with the rotation of the photoreceptors 41 (K, C, M, and Y) are provided.

Further, the image forming apparatus includes developing devices 44 (K, C, M, and Y) that apply toners, serving as developing agents, to electrostatic latent images formed by the line heads 101 (K, C, M, and Y), thereby making the electrostatic latent images into visible images (toner images), first transfer rollers 45 (K, C, M, and Y), serving as transferring units, which sequentially transfer the toner images developed by the developing devices 44 (K, C, M, and Y) to the intermediate transfer belt 50 that is a first transfer target, and cleaning devices 46 (K, C, M, and Y) serving as cleaning units that remove the toner remaining on the surfaces of the respective photoreceptors 41 (K, C, M, and Y) after transfer.

Here, the respective line heads 101 (K, C, M, and Y) are disposed such that the array direction of the respective line heads 101 (K, C, M, and Y) is in accordance with the bus line of the photosensitive drums 41 (K, C, M, and Y). The wavelengths of light-emitting energies of the respective line heads 101 (K, C, M, and Y) are set substantially equal to sensitivity peak wavelengths of the respective photoreceptors 41 (K, C, M, and Y) after transfer.

The developing devices 44 (K, C, M, and Y), for example, using a non-magnetic toner as an developing agent, carries one component developing agent to a developing roller by a supplying roller, regulates the thickness of the developing agent attached to the surface of the developing roller by a regulating blade, makes the developing roller come in contact with or pressed by the respective photoreceptors 41 (K, C, M, and Y), and develops the electrostatic latent image as a toner image by attaching the developing agent according to potential levels of the respective photoreceptors 41 (K, C, M, and Y).

The respective toner images of black, cyan, magenta, and yellow formed by the above-mentioned four single color toner image forming station are sequentially transferred to the intermediate transfer belt 50 by a first transfer bias applied to the first transfer rollers 45 (K, C, M, and Y). Then, the toner images forming a full color after being sequentially overlapped on the intermediate transfer belt 50 are secondarily transferred to a recording medium P, such as paper, through a second transfer roller 66. Then, the toner image is fixed on the recording medium P after passing through a pair of fixing rollers 61, serving as fixing portions, and is then exhausted onto a paper ejecting tray 68 formed on the upper side of the apparatus through a pair of paper ejecting rollers 62.

In FIG. 3, reference numeral 63 indicates a paper feeding cassette in which a plurality of sheets of recording media P are stacked and held, reference numeral 64 indicates a pickup roller which feeds sheets of the recording media P one by one from the paper feeding cassette 63, reference numeral 65x indicates a pair of gate rollers which defines a timing to supply the recording medium P to the second transfer portion of the second transfer roller 66, reference numeral 66 indicates a pair of secondary transfer rollers that serve as secondary transfer units forming secondary transfer portions between the pair of secondary transfer rollers and the intermediate transfer belt 50, and reference numeral 69 indicates a cleaning blade serving as a cleaning unit which removes the toner remaining on the surface of the intermediate transfer belt 50 after the second transferring.

Figure 4:
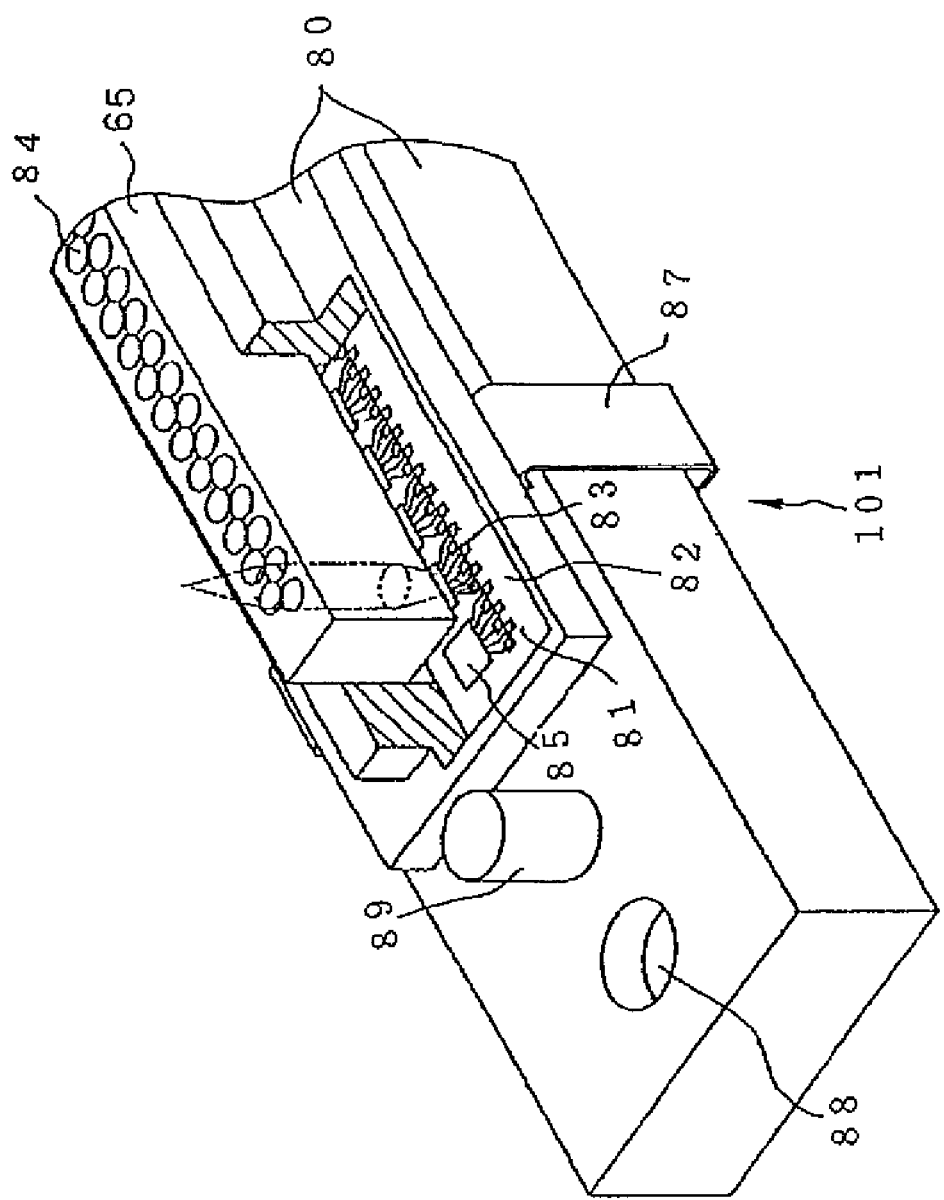
FIG. 4 is a perspective view illustrating a line head according to an embodiment of the invention.

FIG. 4 is an enlarged schematic perspective view of a line head 101. In FIG. 4, an organic EL element array 81 is held inside an elongated housing 80. Positioning pins 89 provided at both ends of the elongated housing 80 are fitted into positioning holes provided at the opposing positions of a case, and setscrews are screwed in and fixed to screw holes of the case through screw inserting holes 88 provided at both ends of the elongated housing 80, thereby fixing each organic EL element array exposure head 101 to a predetermined position.

In the line head 101, light emitting elements (organic EL elements) 83 of the organic EL element array 81 are mounted on the glass substrate 82, and the organic EL element array 81 is driven by a driving circuit 85 formed on the same glass substrate 82. A refractive index distribution type load lens array (SLA) 65 forms an image forming optical system, and arranges the refractive index distribution type load lens arrays 84 disposed on a front surface of the light emitting element 83 in a zigzag. As the load lens array 65, the above-described 'Selfoc lens array' (referred to as SLA, and trade name manufactured by Nippon Sheet Glass Co., Ltd.) is mainly used.

The light beam emitted from the organic EL element array 81 forms an image on a scanned surface as an unmagnified erect image by means of the SLA 65. As such, since the organic EL element 83 is disposed on the glass substrate 82, the light can be radiated onto the image carrier without affecting the light amount of the light emitting element. Further, since the static control can be performed in the organic EL element, a control system of the line head can be simplified.

In the above-described embodiment, the tandem-type color printer that simultaneously forms images of four colors has been exemplified. The invention can be applied to a four-cycle-type color printer in which one photoreceptor and one line head are used and four colors are sequentially transferred to the intermediate transfer medium. The four-cycle-type color printer will be described with reference to FIG. 5. In this case, since the number of line head to be used is one, a process is performed for calculating correction values on the data for the light amount and the image forming characteristic of one line head according to the screens of the respective colors. For this reason, a process for positioning the four heads in the main scanning direction does not need to be performed.

Figure 5:
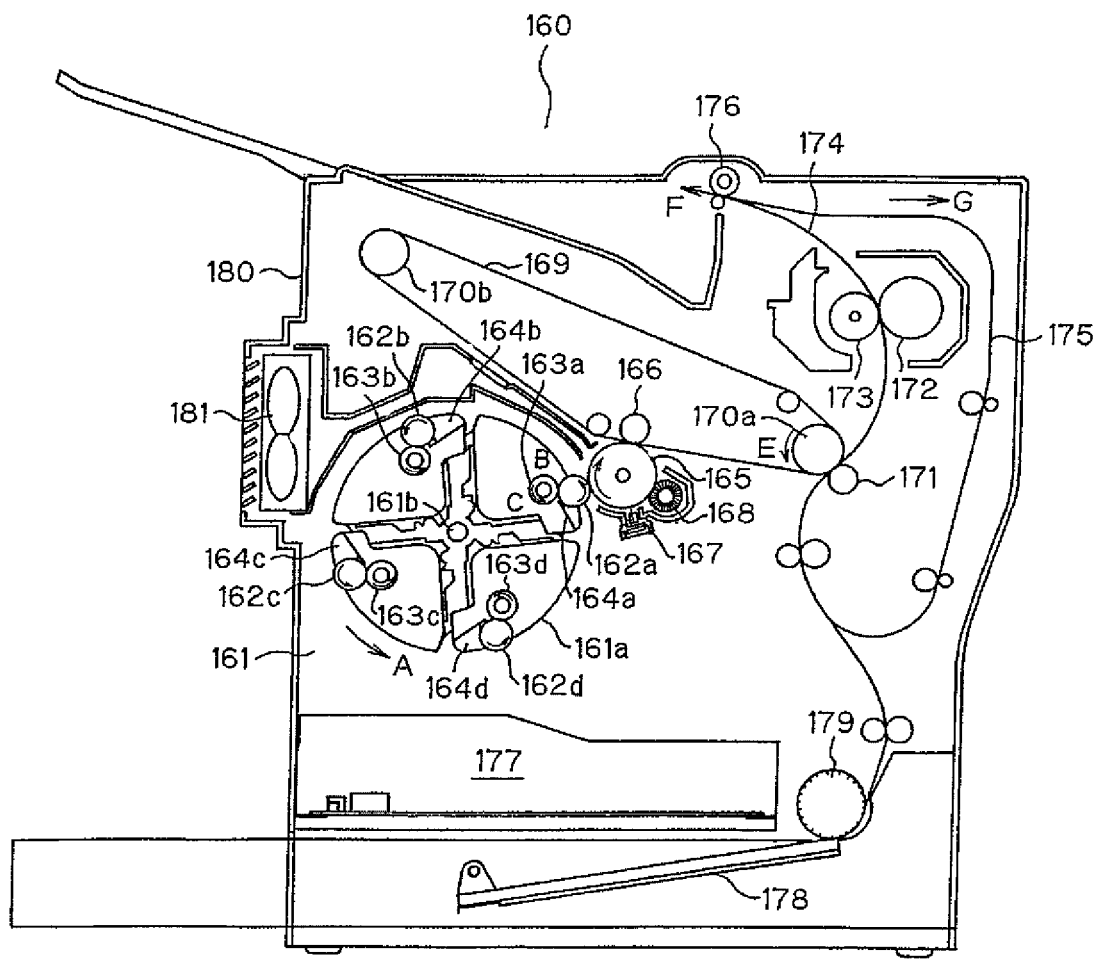
FIG. 5 is a longitudinal sectional view of an image forming apparatus according to another embodiment of the invention.

FIG. 5 is a longitudinal sectional view of an image forming apparatus according to another embodiment of the invention. In FIG. 5, as main constituent members, the image forming apparatus 160 includes a developing device 161 that has a rotary structure, a photosensitive drum 165 that serves as an image carrier, an image writing unit (line head) 167 that is provided with an organic EL element array, an intermediate transfer belt 169, a paper carrying path 174, a heating roller 172 of a fixer, and a paper feeding tray 178.

In the developing device 161, a developing rotary 161a is rotated in the direction of an arrow A around a shaft 161b. The inner part of the developing rotary 161a is divided into four image forming units of four colors of yellow (Y), cyan (C), magenta (M) and black (K). Reference numerals 162a to 162d indicate developing rollers which are provided in the image forming units of the four colors and are rotated in the direction of an arrow B, and reference numerals 163a to 163d indicate toner supply rollers to be rotated in the direction of an arrow C. Moreover, reference numerals 164a to 164d indicate regulating blades for regulating a toner to have a predetermined thickness.

Reference numeral 165 indicates a photosensitive drum that serves as the image carrier as described above, reference numeral 166 indicates a primary transfer member, reference numeral 168 indicates a charger, and reference numeral 167 indicates an image writing unit that is provided with the organic EL array. The photosensitive drum 165 is driven by a driving motor that is not shown, for example, a step motor in the direction of an arrow D which is reverse to the developing roller 162a. The intermediate transfer belt 169 is stretched between a driven roller 170b and a driving roller 170a, and the driving roller 170a is coupled to the driving motor of the photosensitive drum 165, thereby transmitting a power to the intermediate transfer belt. By the driving operation of the driving motor, the driving roller 170a of the intermediate transfer belt 169 is rotated in the direction of an arrow E which is reverse to the photosensitive drum 165.

The paper carrying path 174 is provided with a plurality of carrying rollers and a paper ejecting roller pair 176 so as to carry paper. An image (toner image) of one side carried on the intermediate transfer belt 169 is transferred to one side of the paper at the position of a secondary transfer roller 171. The secondary transfer roller 171 is retractably abutted on the intermediate transfer belt 169 by means of the clutch so that the image is transferred to the paper when the secondary roller 171 is caused to abut on the intermediate transfer belt 169 by an on state of the clutch.

The paper having the image transferred in the above-described manner is then subjected to a fixing process by the fixer having the fixing heater. The fixer is provided with the heating roller 172 and a pressing roller 173. The paper having been subjected to the fixing process is drawn into the paper ejecting roller pair 176 to proceed in the direction of an arrow F. When the paper ejecting roller pair 176 is rotated in a reverse direction in this state, the direction of the paper is inverted and the paper proceeds along a paper carrying path 175 for the two-sided printing 175 in the direction of an arrow G. Reference numeral 177 indicates an electrical equipment box, reference numeral 178 indicates a paper feeding tray that accommodates the paper, and reference numeral 179 indicates a pickup roller that is provided on the outlet of the paper feeding tray 178. In the paper carrying path, as the driving motor that drives the carrying roller, a low speed brushless motor is used. Further, since the color registration correction process is needed in the intermediate transfer belt 169, the step motor is used. These motors are controlled by the signal supplied from the control unit (not shown).

In the state shown in the drawing, a yellow (Y) electrostatic latent image is formed on the photosensitive drum 165 and a high voltage is applied to the developing roller 62a, so that a yellow image is formed on the photosensitive drum 165. If the front side and the rear side of the yellow image are carried to the intermediate transfer belt 169, the developing rotary 161a is rotated at 90 degrees in the direction of the arrow A. After a single circulation of the intermediate transfer belt 169, the intermediate transfer belt 169 returns to the location of the photosensitive drum 165. Next, a cyan (C) two-sided image is formed on the photosensitive drum 165 and overlaps the yellow image carried to the intermediate transfer belt 169. Subsequently, the rotation of 90 degrees of the developing rotary 161a and the one rotation process after the image is carried to the intermediate transfer belt 169 are repeated.

In order to carry color images having four colors, the intermediate transfer belt 169 performs four circulations, the rotation location of the intermediate transfer belt 169 is controlled, and the images are carried to the paper at the position of the secondary transfer roller 171. A paper fed from the paper feeding tray 178 is carried along the paper carrying path 174 and the color image is transferred to one side of the paper at the position of the secondary transfer roller 171. The paper having the image transferred to one side is inverted by the paper ejection roller pair 176 as described above, and waits in the carrying path. Thereafter, the paper is carried to the position of the secondary transfer roller 171 at a predetermined timing so that the color image is transferred to the other side of the paper. The housing 180 is provided with a ventilation fan 181. In this invention, in the rotary-type image forming apparatus shown in FIG. 14, a grayscale expression can be achieved by the simple unit.

Although the line head and the image forming apparatus using the line head according to the embodiments of the invention have been described, the invention is not limited to the specific embodiments, but various changes and modifications can be made.

What is claimed is:
1. An image forming apparatus comprising:
a line head that includes a plurality of pixels disposed in a line shape in a main scanning direction; and
an image processing unit that
creates two-dimensional bit map data to be printed on the basis of a received image signal and an operation instruction,
corrects the two-dimensional bit map data such that a density irregularity is corrected on the basis of light amount data and/or optical characteristic data for each of the pixels of the line head, and controls the pixels of the line head to emit light onto an exposed surface based on the corrected two-dimensional bit map data, wherein the correction of the two-dimensional bit map data is performed before a screen process on dots or fine parallel lines is performed.

2. An image forming apparatus comprising:

a line head that includes a plurality of pixels disposed in a line shape in a main scanning direction; and an image processing unit that creates two-dimensional bit map data to be printed on the basis of a received image signal and an operation instruction, corrects the two-dimensional bit map data such that a density irregularity is corrected on the basis of light amount data and/or optical characteristic data for each of the pixels of the line head, and controls the pixels of the line head to emit light onto an exposed surface based on the corrected two-dimensional bit map data, wherein the correction of the two-dimensional bit map data is performed on a natural image or a graphic and is not performed on a fine line or a character.

3. An image forming apparatus comprising:

a line head that includes a plurality of pixels disposed in a line shape in a main scanning direction; and an image processing unit that creates two-dimensional bit map data to be printed on the basis of a received image signal and an operation instruction, corrects the two-dimensional bit map data such that a density irregularity is corrected on the basis of light amount data and/or optical characteristic data for each of the pixels of the line head, and controls the pixels of the line head to emit light onto an exposed surface based on the corrected two-dimensional bit map data, wherein the correction of the two-dimensional bit map data changes a correction degree according to a density of the two-dimensional bit map data.

4. An image forming apparatus comprising:

a line head that includes a plurality of pixels disposed in a line shape in a main scanning direction; and an image processing unit that creates two-dimensional bit map data to be printed on the basis of a received image signal and an operation instruction, corrects the two-dimensional bit map data such that a density irregularity is corrected on the basis of light amount data and/or optical characteristic data for each of the pixels of the line head, and controls the pixels of the line head to emit light onto an exposed surface based on the corrected two-dimensional bit map data, wherein the image forming apparatus changes a correction degree according to a type of a screen to be used, when a grayscale screen for expressing a grayscale of the two-dimensional bit map data is divided into a plurality of grayscale screens according to the type of the two-dimensional bit map data or setting of a user and used.

5. An image forming apparatus comprising:

a line head that includes a plurality of pixels disposed in a line shape in a main scanning direction; and an image processing unit that creates two-dimensional bit map data to be printed on the basis of a received image signal and an operation instruction, corrects the two-dimensional bit map data such that a density irregularity is corrected on the basis of light amount data and/or optical characteristic data for each of the pixels of the line head, and controls the pixels of the line head to emit light onto an exposed surface based on the corrected two-dimensional bit map data, wherein the correction of the two-dimensional bit map data is performed after performing a process for changing an exposure location of the two-dimensional bit map data in the line head on the basis of margin information of a main scanning direction instructed by a user or application software.

6. An image forming apparatus comprising:

a line head that includes a plurality of pixels disposed in a line shape in a main scanning direction; and an image processing unit that creates two-dimensional bit map data to be printed on the basis of a received image signal and an operation instruction, corrects the two-dimensional bit map data such that a density irregularity is corrected on the basis of light amount data and/or optical characteristic data for each of the pixels of the line head, and controls the pixels of the line head to emit light onto an exposed surface based on the corrected two-dimensional bit map data, wherein the correction of the two-dimensional bit map data is performed after performing a process for changing an exposure location of the two-dimensional bit map data in the line head on the basis of image location information of a main scanning direction stored in a printer main body.

7. An image forming apparatus comprising:

a line head that includes a plurality of pixels disposed in a line shape in a main scanning direction: and an image processing unit that creates two-dimensional bit map data to be printed on the basis of a received image signal and an operation instruction, corrects the two-dimensional bit map data such that a density irregularity is corrected on the basis of light amount data and/or optical characteristic data for each of the pixels of the line head, and controls the pixels of the line head to emit light onto an exposed surface based on the corrected two-dimensional bit map data, wherein the optical characteristic is a numerical value that is calculated from a light amount distribution of a spot formed when a light beam corresponding to each pixel forms an image on the exposed surface.

8. An image forming apparatus comprising:

a line head that includes a plurality of pixels disposed in a line shape in a main scanning direction; and an image processing unit that creates two-dimensional bit map data to be printed on the basis of a received image signal and an operation instruction, corrects the two-dimensional bit map data such that a density irregularity is corrected on the basis of light amount data and/or optical characteristic data for each of the pixels of the line head, and controls the pixels of the line head to emit light onto an exposed surface based on the corrected two-dimensional bit map data, wherein the optical characteristic is a wavelength of each pixel.

9. The image forming apparatus according to claim 8, wherein the light amount data and the optical characteristic data are individually written for each pixel.

10. The image forming apparatus according to claim 8, wherein the light amount data and the optical characteristic data are stored in a nonvolatile memory provided in the line head for each pixel.

11. An image forming apparatus comprising:
   a line head that includes a plurality of pixels disposed in a line shape in a main scanning direction; and
   an image processing unit that
      creates two-dimensional bit map data to be printed on the basis of a received image signal and an operation instruction,
      corrects the two-dimensional bit map data such that a density irregularity is corrected on the basis of light amount data and/or optical characteristic data for each of the pixels of the line head, and
      controls the pixels of the line head to emit light onto an exposed surface based on the corrected two-dimensional bit map data, wherein
   the image forming apparatus is a color image forming apparatus, and
   the correction process is performed on image data of each color after a color conversion according to colors of color materials that are included in the image forming apparatus.

12. The image forming apparatus according to claim 11, wherein a correction process is performed on the two-dimensional bit map data on the basis of color registration information in the main scanning direction for each color stored in a control unit of a printer, with respect to information after being divided into color data according to the color materials included in the image forming apparatus, after performing the process for changing the exposure location of the image data of each color in the line head.

13. The image forming apparatus according to claim 11, wherein the image forming apparatus is a color image forming apparatus that simultaneously forms a plurality of colors of images by using a plurality of line heads.

14. The image forming apparatus according to claim 11, wherein the image forming apparatus is a color image forming apparatus that has one line head, and sequentially forms a plurality of colors of images and forms the plurality of colors of images on an intermediate transfer medium to overlap one another.

15. A method of forming an image, the method comprising:
   creating two-dimensional bit map data to be printed on the basis of a received image signal and an operation instruction;
   storing light amount data and/or optical characteristic data for each pixel of a line head in a storage unit of the line head;
   correcting the two-dimensional bit map data so as to correct a density irregularity on the basis of the light amount data and/or optical characteristic data for each of the pixels of the line head; and
   controlling the pixels of the line head to emit light onto an exposed surface based on the corrected two-dimensional bit map data,
   wherein the correction of the two-dimensional bit map data is performed before a screen process on dots or fine parallel lines is performed.

* * * * *